Aug. 17, 1948.  B. M. HOLLOWAY  2,447,179
SWIVEL CONNECTOR
Filed Sept. 12, 1944

Inventor
Berkely Marvin Holloway

By Clarence A. O'Brien
and Harvey B. Jacobson
Attorneys

Patented Aug. 17, 1948

2,447,179

UNITED STATES PATENT OFFICE 2,447,179

SWIVEL CONNECTOR

Berkely Marvin Holloway, Filbert, W. Va.

Application September 12, 1944, Serial No. 553,778

2 Claims. (Cl. 287—91)

This invention appertains to new and useful improvements in connectors of the swivel type.

The principal object of the present invention is to provide a swiveled link connector which can be used to advantage with automatic couplers on mine cars and on various hoist lines, draft cables and the like.

Other objects and advantages of the invention will become apparent to the reader of the following description.

Figure 1:
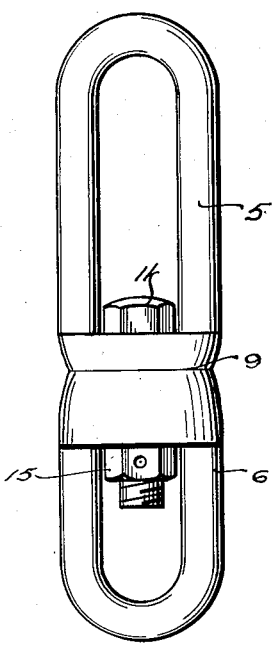
Figure 1 is a side elevational view.
Figure 2:
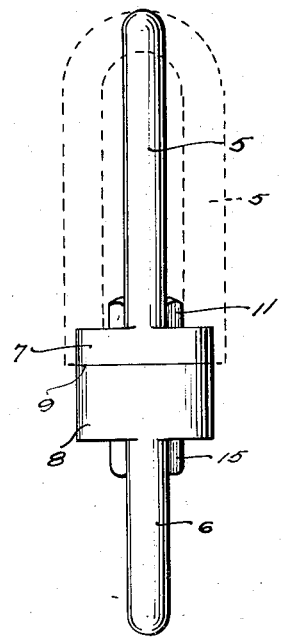
Figure 2 is a side elevational view looking at a portion ninety degrees removed from the side portion shown in Figure 1.

Referring to the drawings wherein like numerals designate like parts, it can be seen that two link members 5, 6 are employed. These link members may be of uniform size and shape or one may be shorter than the other as shown in Figure 1.

The links 5, 6 have opposed thickened end portions 7, 8, respectively, and they have smooth opposed faces 9.

The thickened portion 7 has an opening therethrough for receiving a bolt 10, which has a head 11. The thickened portion 7 has a counterbore 12 containing a coiled spring 13 which extends into a counterbore 14 in the thickened portion 8 of the link 6 which is in complement to a smaller bore through which the bolt 10 also extends. The portion of the bolt 10 which protrudes into the link 6 is equipped with a nut 15 and preferably a cotter key or the like is disposed through the bolt and nut to prevent displacement.

Figure 3:
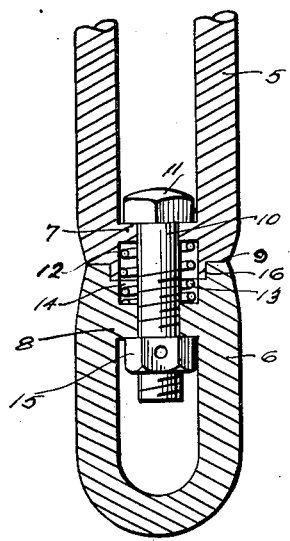
Figure 3 is a fragmentary vertical sectional view.
Figure 4:
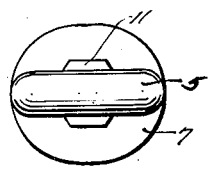
Figure 4 is an end elevational view.

The thickened portion 7 of the link 5 has a reduced skirt-like formation 16 which projects into an annular recess in the opposed face of the link 6, as clearly shown in Figure 3. The spring 14 sets up sufficient friction between the parts so that there is no tendency of the links to easily swivel, yet allowing for such action when the occasion demands.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A swivel connector comprising a pair of looped link members, the adjacent ends of said link members being thickened and having flattened abuting surfaces with coaxial bores, a bolt in said bores swivelly connecting said members, the opposed thickened portions of the link members being provided with counterbores in said flattened surfaces, and a coiled compression spring disposed in said counterbores impinging against the bottom of each in the link members.

2. A swivel connector comprising a pair of looped link members, the adjacent ends of said link members being thickened and having flattened abuting surfaces with coaxial bores, a bolt in said bores swivelly connecting said members, the opposed thickened portions of the link members being provided with counterbores in said flattened surfaces, and a coiled compression spring disposed in said counterbores impinging against the bottom of each in the link members. one of said link members having an annular recess in its abutment surface, the other link member being provided with a corresponding reduced skirt for snug disposition in said annular recess preventing side slipping.

BERKELY MARVIN HOLLOWAY.

REFERENCES CITED

The following references are of record in the file of this patent:

UNITED STATES PATENTS

| Number | Name | Date |
|---|---|---|
| 176,905 | Walton | May 2, 1876 |
| 987,391 | Mitchell | Mar. 21, 1911 |
| 1,034,882 | Crane | Aug. 6, 1912 |
| 1,424,820 | Heap | Aug. 8, 1922 |
| 2,364,599 | Burrus | Dec. 12, 1944 |